US012677724B2

(12) United States Patent　　　　　(10) Patent No.:　US 12,677,724 B2
Kachlany et al.　　　　　　　　　　　(45) Date of Patent:　　Jul. 14, 2026

(54) HANDHELD PLANTING APPARATUS

(71) Applicant: GARDINNOVATIONS, Bridgewater, NJ (US)

(72) Inventors: Scott C. Kachlany, Bridgewater, NJ (US); Teri T. Chu, Sacramento, CA (US)

(73) Assignee: Gardinnovations, Bridgewater, NJ (US)

( * ) Notice: Subject to any disclaimer, the term of this patent is extended or adjusted under 35 U.S.C. 154(b) by 1378 days.

(21) Appl. No.: 17/351,469

(22) Filed: Jun. 18, 2021

(65) Prior Publication Data

US 2022/0007566 A1　　Jan. 13, 2022

Related U.S. Application Data

(60) Provisional application No. 63/050,318, filed on Jul. 10, 2020.

(51) Int. Cl.
A01C 5/02　　　　　　(2006.01)
(52) U.S. Cl.
CPC ..................................... A01C 5/02 (2013.01)
(58) Field of Classification Search
CPC .................................... A01C 5/02; A01C 5/00
See application file for complete search history.

(56) References Cited

U.S. PATENT DOCUMENTS

| | | | | | |
|---|---|---|---|---|---|
| 1,106,203 | A | * | 8/1914 | Gross | A01B 1/022 |
| | | | | | 294/51 |
| 1,564,721 | A | * | 12/1925 | Tallon | A01C 5/02 |
| | | | | | 33/669 |
| 2,044,871 | A | * | 6/1936 | Beasley | A01C 5/02 |
| | | | | | 111/99 |
| 4,275,672 | A | * | 6/1981 | Clad | A01C 5/02 |
| | | | | | 111/99 |
| 4,736,694 | A | * | 4/1988 | Kratky | A01C 11/00 |
| | | | | | 294/51 |
| 5,492,070 | A | * | 2/1996 | Lefkow | A01C 5/02 |
| | | | | | 294/51 |
| D679,155 | S | * | 4/2013 | Eccles | D8/1 |
| D687,683 | S | * | 8/2013 | Lin | D8/1 |
| 9,884,408 | B1 | * | 2/2018 | Mikulich | B25B 13/5091 |
| 2003/0097759 | A1 | * | 5/2003 | Bond | A47J 43/288 |
| | | | | | 30/340 |
| 2006/0016047 | A1 | * | 1/2006 | Blackman | E04H 4/1609 |
| | | | | | 16/231 |
| 2007/0212993 | A1 | * | 9/2007 | Annis | B24D 15/023 |
| | | | | | 451/523 |

* cited by examiner

*Primary Examiner* — Joseph M Rocca
(74) *Attorney, Agent, or Firm* — Wood, Phillips, Katz, Clark & Mortimer

(57)　　　　　　　　ABSTRACT

An apparatus for forming a plurality of uniformly-spaced holes in soil includes a handle portion for being gripped by a user of the apparatus, a linear rail portion extending from the handle portion defining a central axis, and a plurality of projections extending from the linear rail portion that are arranged in an adjacent relationship along the central axis. In one form, the spacing of the plurality of projections along the central axis is selected based one or more species of plants.

5 Claims, 3 Drawing Sheets

HANDHELD PLANTING APPARATUS

PRIORITY

This application claims priority of U.S. Provisional Patent Application No. 63/050,318, filed Jul. 10, 2020, the entire contents of which is incorporated herein by reference.

FIELD OF THE INVENTION

The present invention relates generally to a handheld apparatus for assisting in the planting of seeds, and more particularly to a lightweight, low-cost apparatus having a plurality of adjacent projections for simultaneously creating numerous evenly-spaced holes in the soil.

BACKGROUND OF THE INVENTION

Plants absorb water and nutrients through their roots, which can extend deep below the surface of the soil. However, adjacent plants that grow too close together can shade one another's leaves, while their root systems will compete for limited water and nutrients. Crowding of plants can result in stunted growth, reduced flower clusters, and decreased yields.

Typically, a gardener must measure and manually dig each hole for optimal growth of a given plant species. There remains a need for an improved apparatus for effectively forming adjacent holes for a given plant species to reduce the likelihood of interference between adjacent plants and to assist in obtaining optimal yields.

There remains a need for providing such an improved, lightweight apparatus in a manner that is amenable to mass-production at a reasonable cost.

BRIEF SUMMARY OF THE INVENTION

In accordance with the present invention, an apparatus for forming a plurality of uniformly-spaced holes in soil includes a handle portion for being gripped by a user of the apparatus. The apparatus further includes a linear rail portion extending from the handle portion that defines a central axis. The apparatus includes a plurality of projections extending from the linear rail portion arranged in an adjacent relationship along the central axis.

In one preferred form of the present invention, each one of the plurality of projections is conical in shape.

In another preferred form of the present invention, each one of the plurality of projections extends outwardly from the linear rail portion between about 40 mm and about 60 mm, as measured in an orthogonal direction relative to the central axis.

In still another preferred form of the present invention, the linear rail portion includes a plurality of lateral recesses separated by ribs extending generally perpendicular to the central axis.

According to another preferred form of the present invention, the handle portion is hollow.

In accordance with another preferred form of the present invention, the handle portion includes an attachment means for receiving a portion of a pole or other tool therein. More preferably, the attachment means is an internal screw thread extending within the handle portion.

In still another preferred form of the present invention, the apparatus is unitarily constructed from a polymer.

According to another preferred form of the present invention, the plurality of projections are spaced apart a predetermined distance along the central axis based upon a selected species of a plant to be planted in a plurality of uniformly-spaced holes in soil.

In another broad form of the invention, a method of forming a plurality of uniformly-spaced holes in soil includes the steps of obtaining one of the aforementioned apparatus embodiments discussed above, gripping the handle portion of the apparatus, inserting the plurality of projections into soil such that the linear rail portion contacts the soil so as to form a plurality of uniformly-spaced holes in the soil, and removing the plurality of projections from the soil. In one preferred form of the present invention, the method further includes the step of selecting the apparatus based on a species of a plant to be planted in the plurality of uniformly-spaced holes in soil.

Other features and advantages will become readily apparent from the accompanying drawings and the appended claims.

BRIEF DESCRIPTION OF THE DRAWINGS

In the accompanying drawings forming part of the specification, in which like numerals are employed to designate like parts throughout the same.

DETAILED DESCRIPTION OF THE PREFERRED EMBODIMENTS

Figures 1, 2:
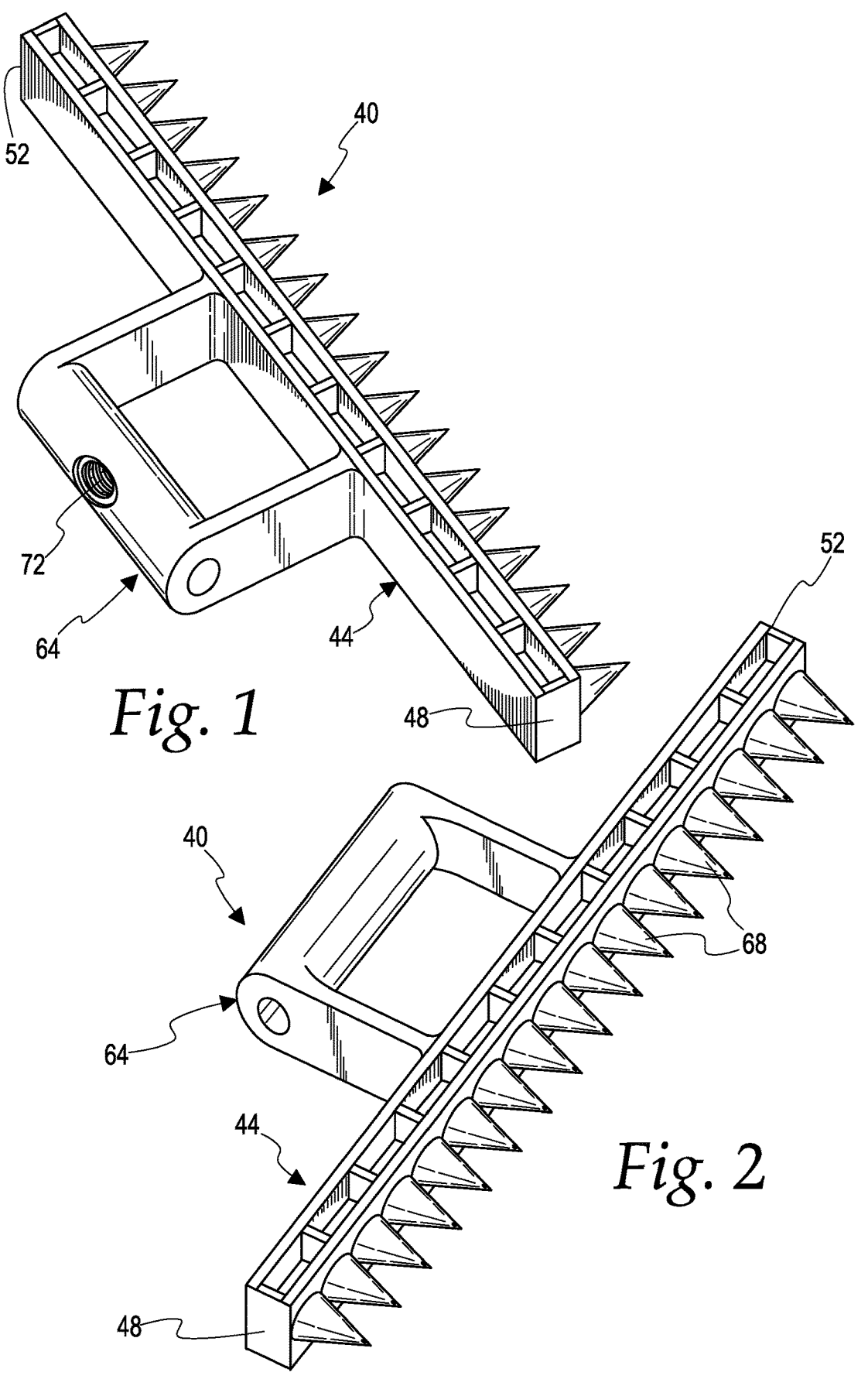
FIG. 1 is a greatly reduced-size, isometric view, taken from above, of an illustrated embodiment of an apparatus according to the present invention.
FIG. 2 is an isometric view, taken from below, of the apparatus shown in FIG. 1.

While the present invention is susceptible of embodiment in various forms, there is shown in the drawings and will hereinafter be described the presently preferred embodiment, with the understanding that the present disclosure should be considered as an exemplification of the invention and is not intended to limit the invention to the specific embodiment illustrated.

In accordance with the illustrated preferred embodiment of the invention illustrated in FIGS. 1-8, the invention has the form of a handheld device or apparatus 40.

Figures 3, 4, 5:
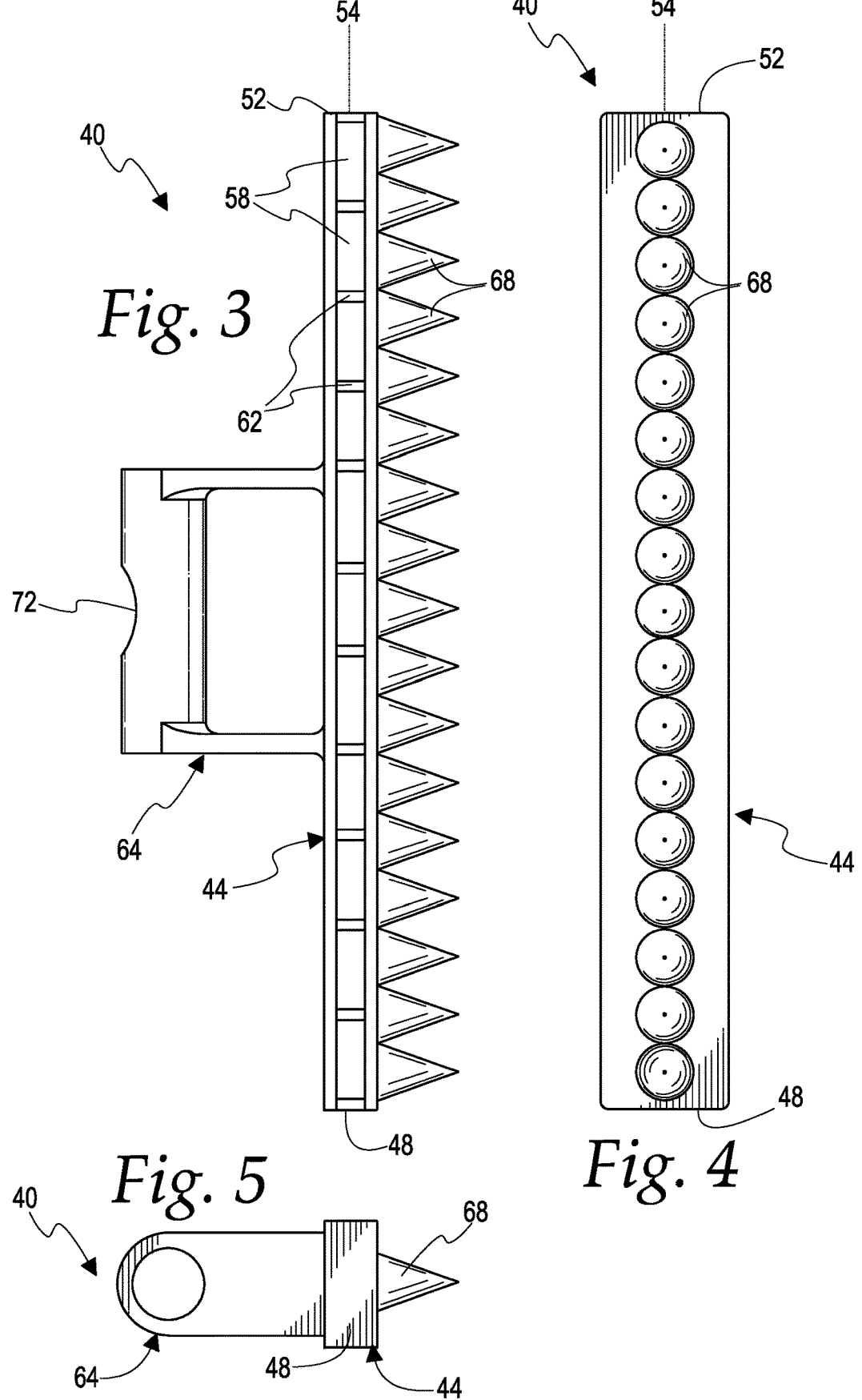
FIG. 3 is a side elevation view of the apparatus shown in FIG. 1.
FIG. 4 is a bottom plan view of the apparatus shown in FIG. 1.
FIG. 5 is a front elevation view of the apparatus shown in FIG. 1.
Figures 6, 7, 8:
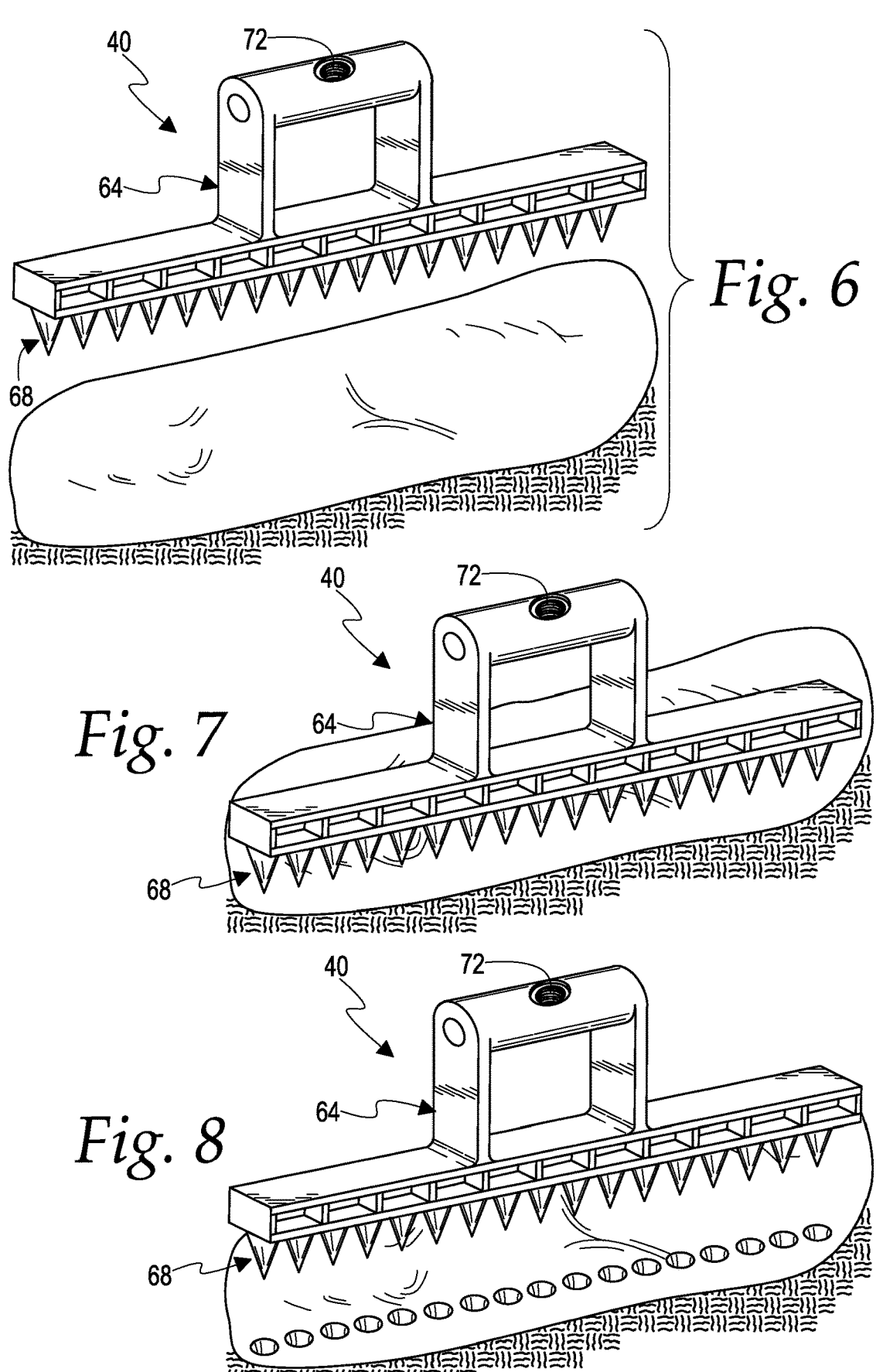
FIGS. 6-8 are isometric views, taken from above, of the apparatus shown in FIG. 1 being used to create holes in soil.

With reference to FIG. 3, the apparatus 40 includes an elongate, platform or linear rail portion 44 having a proximal end 48 and a distal end 52, and defines a central axis 54 extending between the ends. The linear rail portion 44 is somewhat planar and has a rectangular configuration for supporting other components of the apparatus 40, and further functions as a stop mechanism when engaging the apparatus 40 with soil (e.g., as illustrated in FIG. 7), which will be discussed in greater detail below. The linear rail portion 44 includes a plurality of rectangular, lateral recesses 58, each separated by a vertical rib 62. The recesses 58 lower the weight of the apparatus 40 while the ribs 62 provide sufficient rigidity to the rail portion 44. A hand grip or handle portion 64 extends outwardly from the center of the rail portion 44 in a normal or transverse direction relative to the axis 54. The handle portion 64 is hollow, defining a through passage for reduction of weight of the apparatus 40. It will be appreciated that other handle or gripping means may be employed, such as a knob, strap, pole attachment, etc. Furthermore, the apparatus 40 may include two handle portions 64 if the length linear rail portion 44 is increased (not illustrated).

Referring now to FIGS. 3 and 4, the apparatus 40 further includes a plurality of projections 68 extending outwardly from the linear rail portion 44, in a normal or transverse direction relative to the axis 54 and opposite the handle portion 64. Each of the projections 68 is centrally aligned with the central axis 54 of the linear rail portion 44 in an adjacent, side-by-side manner. In one preferred form, each projection 68 is conical in shape, and extending between 40 and 60 mm from the top surface of the linear rail portion. It will be understood that different shapes of projections 68 may be utilized, depending on the application, such as tapering cylinders or other polygonal or irregular shapes. In the illustrated preferred embodiment of the apparatus 40, the tips or points of the conical projections 68 are nominally spaced about 1" apart along the central axis 54, and would be ideal spacing for plants such as lettuce, beans, carrots, radishes, etc. It will further be understood that the linear spacing of the projections along the central axis 54 may be varied depending on the selected species of plant. For example, the conical projections 68 may be nominally spaced about 2" or 3" apart for greens, mature leaf spinach, turnips, etc., and the conical projections 68 may be nominally spaced about 18" apart for cauliflower, eggplant, summer squash, etc.

It will further be understood that while the preferred form of the apparatus 40 that is illustrated has only a single, linear row of projections 68 extending along the axis 54, the apparatus 40 could be modified to include two or more distinct rows of projections 68 with a predetermined lateral spacing (not illustrated) depending on the selection of the species being planted.

The apparatus 40 is preferably unitarily formed or molded from a single polymer such as polyamide, polyethylene, polypropylene, acrylonitrile butadiene styrene, etc. Other materials may be used. Furthermore, one or more of the features of the apparatus 40 may be separately formed, and subsequently assembled together into the working form as illustrated.

It will be appreciated that the height or depth of the projections 64, in the normal direction relative to the central axis 54, may be increased or decreased based on the selection of the species being planted.

With reference now to FIG. 1, the handle portion 64 may further include an attachment means for connecting a pole or other tool to the apparatus 40. The preferred attachment means is an internal thread 72 extending into the center of the handle portion 64 for receiving a male thread (not illustrated) on a distal end of a pole or other tool. The attachment means could also be snap-fit, luer lock, clamp or joint allowing the apparatus 40 to have one or more degrees of freedom or rotation relative to a pole or other tool.

With reference to FIGS. 6-8, the inventor has found that the apparatus 40 is able to function as a lightweight, low-cost stamp to simultaneously create numerous evenly-spaced holes in soil. This eliminates the need for manual measurement between manually dug holes. Seeds or seedlings may then be placed within each hole for maximal efficiency. The linear rail portion 44 functions as a stop when each conical projection 64 is fully buried in the soil, which results in consistent hole depths. It will be understood that, in some applications, the apparatus 40 may be part of a system of devices with varied linear spacing between projections 64 for use with different species of plants. The apparatus may have indica or color coding indicating the nominal linear spacing between projections 64. Accordingly, the apparatus 40 may have one or more of the following advantages for adjacent plants: optimizing yields; preventing overlap of plant leaves; preventing root competition; conservation of water; etc.

From the foregoing, it will be observed that numerous modifications and variations can be effected without departing from the true spirit and scope of the novel concept of the present invention. It is to be understood that no limitation with respect to the specific embodiment illustrated herein is intended or should be inferred. The disclosure is intended to cover, by the appended claims, all such modifications as fall within the scope of the claims.

The invention claimed is:

1. A handheld apparatus for forming a plurality of uniformly-spaced holes in soil, said handheld apparatus comprising:
   a handle portion for being gripped by a user of said handheld apparatus;
   a linear rail portion extending from said handle portion, said linear rail portion defining a central axis; and
   a plurality of projections extending from said linear rail portion arranged in an adjacent relationship along said central axis, wherein said linear rail portion includes a plurality of lateral recesses separated by ribs extending perpendicular to said central axis.

2. The handheld apparatus according to claim 1 wherein said handheld apparatus is unitarily constructed from a polymer.

3. A handheld apparatus for forming a plurality of uniformly-spaced holes in soil, said handheld apparatus comprising:
   a handle portion for being gripped by a user of said handheld apparatus;
   a linear rail portion extending from said handle portion, said linear rail portion defining a central axis; and
   a plurality of projections extending from said linear rail portion arranged in an adjacent relationship along said central axis, wherein said plurality of projections are spaced apart a predetermined distance along said central axis based upon a selected species of a plant to be planted in said plurality of uniformly-spaced holes in soil, and wherein said handheld apparatus is unitarily constructed from a polymer.

4. A method of forming a plurality of uniformly-spaced holes in soil, the method comprising the steps of:
   a. obtaining a handheld apparatus for forming a plurality of uniformly-spaced holes in soil, said handheld apparatus comprising:
   a handle portion for being gripped by a user of said handheld apparatus;
   a linear rail portion extending from said handle portion, said linear rail portion defining a central axis; and
   a plurality of projections extending from said linear rail portion arranged in an adjacent relationship along said central axis, wherein said handheld apparatus is unitarily constructed from a polymer;
   b. gripping said handle portion of said handheld apparatus;
   C. inserting said plurality of projections into soil such that said linear rail portion contacts the soil so as to form a plurality of uniformly-spaced holes in the soil; and
   d. removing said plurality of projections from the soil.

5. The method according to claim 4 further comprising the step of selecting said handheld apparatus based on a species of a plant to be planted in said plurality of uniformly-spaced holes in soil.

\* \* \* \* \*